United States Patent [19]
Czachor et al.

[11] Patent Number: 5,357,744
[45] Date of Patent: Oct. 25, 1994

[54] SEGMENTED TURBINE FLOWPATH ASSEMBLY

[75] Inventors: Robert P. Czachor, Cincinnati; Christopher C. Glynn, Hamilton, both of Ohio

[73] Assignee: General Electric Company, Cincinnati, Ohio

[21] Appl. No.: 86,406

[22] Filed: Jul. 1, 1993

Related U.S. Application Data

[63] Continuation of Ser. No. 896,021, Jun. 9, 1992, abandoned.

[51] Int. Cl.⁵ .............................................. F02C 7/00
[52] U.S. Cl. ................................. 60/39.32; 60/39.75; 415/134
[58] Field of Search ................ 60/39.31, 39.32, 39.75; 415/134, 135, 136, 137, 138, 139

[56] References Cited

U.S. PATENT DOCUMENTS

| | | | |
|---|---|---|---|
| 2,803,943 | 8/1957 | Rainbow | 60/39.31 |
| 2,915,280 | 12/1959 | Sonder | 253/78 |
| 2,933,893 | 4/1960 | Blyth et al. | 60/39.16 |
| 2,941,781 | 6/1960 | Boyum | 253/39 |
| 3,104,525 | 9/1963 | Shields | 60/39.32 |
| 3,362,681 | 1/1968 | Smuland | 415/134 |
| 4,288,201 | 9/1981 | Wilson | 415/136 |
| 4,414,816 | 11/1983 | Craig et al. | 60/757 |
| 4,720,236 | 1/1988 | Stevens | 415/134 |
| 4,756,153 | 7/1988 | Roberts | 415/137 |
| 4,793,770 | 12/1988 | Schonewald et al. | 415/190 |
| 4,907,946 | 3/1990 | Ciokajlo et al. | 415/209.3 |
| 4,920,742 | 5/1990 | Nash et al. | 60/39.32 |
| 4,921,401 | 5/1990 | Hall et al. | 415/138 |
| 4,944,151 | 7/1990 | Hovnanian | 60/39.32 |
| 4,987,736 | 1/1991 | Ciokajlo et al. | 60/39.31 |
| 4,993,918 | 2/1991 | Myers et al. | 415/191 |
| 5,088,888 | 2/1992 | Bobo | 415/138 |

FOREIGN PATENT DOCUMENTS

| | | |
|---|---|---|
| 00846329 | 8/1960 | United Kingdom . |
| 2226600 | 7/1990 | United Kingdom . |
| 2262573A | 6/1993 | United Kingdom . |

Primary Examiner—Richard A. Bertsch
Assistant Examiner—Timothy S. Thorpe
Attorney, Agent, or Firm—Jerome C. Squillaro; Nathan D. Herkamp

[57] ABSTRACT

A turbine flowpath assembly includes a plurality of circumferentially spaced apart airfoils disposed within an annular outer casing. Each of the airfoils includes outer and inner integral bands. A plurality of flowpath outer and inner panels are disposed between adjacent ones of the bands and circumferentially overlap the bands. The panels and bands are joined together at the respective overlaps for allowing circumferential movement therebetween while providing sealing.

10 Claims, 7 Drawing Sheets

SEGMENTED TURBINE FLOWPATH ASSEMBLY

This is a continuation of application Ser. No. 07/896,021, filed Jun. 9, 1992 now abandoned.

The present invention relates generally to gas turbine engines, and, more specifically, to a turbine flowpath therein.

BACKGROUND OF THE INVENTION

A conventional gas turbine engine includes a compressor for providing compressed air to a combustor wherein it is mixed with fuel and ignited for generating combustion gases. The hot combustion gases are channeled to turbine blade-rows for extracting energy therefrom for powering the compressor and for generating thrust in propelling an aircraft, for example. All of the turbine flowpaths which channel the combustion gases are heated thereby and are subject to thermally induced stress therein. Since a turbine is axisymmetrical, the many annular structures therein are subject to radial thermal growth which increases their diameter and circumference when heated by the combustion gases. In order to reduce the thermal growth and stresses therein, the flowpaths are typically configured as circumferentially segmented components which permit unrestrained circumferential, or tangential, thermal expansion of the individual components, as well as radial thermal expansion thereof.

For example, conventional stator shrouds surrounding turbine blade-rows comprise a plurality of circumferentially adjoining individual shrouds or shroud segments which are conventionally joined to an annular outer casing. The inner surfaces of the shrouds form the radially outer flowpath of the combustion gases, and the outer surfaces of the shrouds are provided with cooling air channeled through the outer casing for cooling the shrouds. Since the outer casing is an annular structure maintained at a lower temperature than the shrouds being heated by the combustion gases, it expands radially outwardly at a different rate than that of the shrouds. If the shrouds were a fully annular, non-segmented structure, considerable thermal stress would be generated therein due, in part, to the restraint provided by the outer casing to which the shroud is attached.

By circumferentially segmenting the shroud, it is allowed to freely expand and contract in the circumferential direction which reduces thermal stress therein. However, suitable seals must then be provided between the individual segmented shrouds to prevent escape of the combustion gases radially outwardly toward the outer casing as well as prevent leakage of the compressed cooling air radially inwardly therebetween into the hot combustion gases. Sealing between the segmented shrouds is typically accomplished with conventional spline seals which are straight members disposed in complementary, U-shaped circumferentially facing slots disposed in the shroud edges. A predetermined radial gap is provided between the spline seal and its complementary slots for allowing alignment and assembly of the adjacent shrouds while still providing effective sealing therebetween.

A conventional turbine nozzle provides another example of a segmented flowpath wherein the individual nozzle stator vanes include radially outer and inner bands formed integrally with the vanes, which bands have a large circumferential overhang relative to the airfoil to adjoin adjacent vanes. The circumferential edges of the vane bands are also sealed using conventional spline seals.

As the diameter of the turbine flowpaths increase for larger and larger gas turbine engines, several significant problems arise. For example, relatively large circumferential and axial dimensions of individual flowpath segments create unavoidable fit-up difficulties at the segment edges during assembly. Both manufacturing variations and operation induced creep deformations of the segments increase the difficulty of alignment and installation of the axially extending spline seals therebetween. In the example of the nozzle vanes, large circumferential overhang of the vane bands increases the potential for dimensional variations thereof resulting in radial misalignment between adjacent vane bands.

The misalignment of adjacent bands significantly reduces the ability of the spline seals to form an effective seal therebetween. Conventional spline seals require two flat and parallel surfaces for the backside pressure provided by the compressed air to load the spline seal itself radially inwardly in its respective slot to form an effective seal therewith. Misalignment of the slot increases leakage past the spline seal significantly.

The relatively large length of the axial splitline in large diameter applications, increases the difficulty of spline seal design especially where the required joint to be sealed is nonlinear. Since spline seals must be straight in the axial plane of the engine in order to effectively seal a large number of axially spaced apart spline seals must be used to follow an axially varying or arcuate flowpath contour to provide effective sealing between the circumferentially adjacent components. A highly curved axial flowpath also increases the difficulty of radial alignment of the adjacent components during initial assembly. And, during operation as the components vary in configuration due to creep deformations thereof, maintaining alignment between the components becomes more difficult, and the ability of the spline seals to effectively seal the flowpath is further increased.

Tests have shown that spline seals in conventional shroud and nozzle applications, have relatively large leakage rates consistent with an effective 0.05 mm gap at the sealing surface. As the axial length of the sealed joint increases, leakage rates are further increased.

OBJECTS OF THE INVENTION

Accordingly, one object of the present invention is to provide a new and improved segmented turbine flowpath assembly.

Another object of the present invention is to provide a turbine flowpath assembly having improved mounting, sealing, and alignment of the components thereof.

Another object of the present invention is to provide a turbine flowpath assembly for a large diameter and large axial extent application.

SUMMARY OF THE INVENTION

A turbine flowpath assembly includes a plurality of circumferentially spaced apart airfoils disposed within an annular outer casing. Each of the airfoils includes outer and inner integral bands. A plurality of flowpath outer and inner panels are disposed between adjacent ones of the bands and circumferentially overlap the bands. The panels and bands are joined together at the respective overlaps for allowing circumferential movement therebetween while providing sealing.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
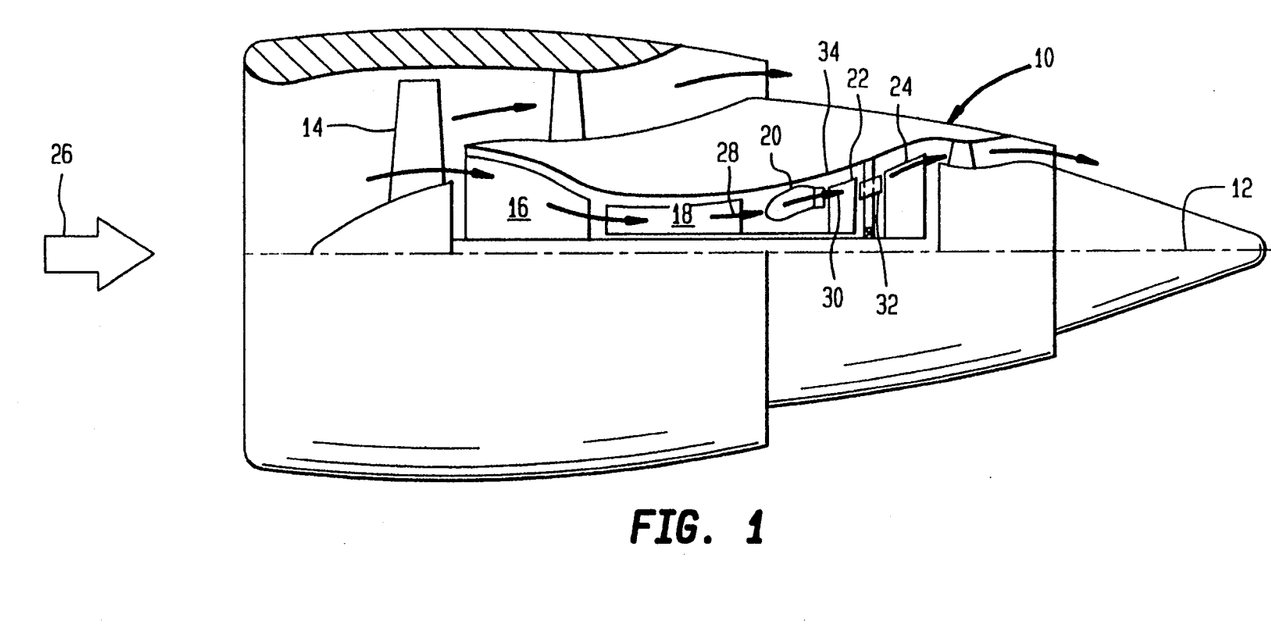
FIG. 1 is an axial, partly sectional view of an exemplary turbofan gas turbine engine including a turbine flowpath assembly in accordance with one embodiment of the present invention.

Illustrated in FIG. 1 is a schematic representative of an exemplary turbofan gas turbine engine 10 having a longitudinal or axial centerline axis 12. The engine 10 includes in serial flow communication a fan 14, a booster compressor 16, a high pressure compressor 18, a combustor 20, a high pressure turbine (HPT) 22, and a low pressure turbine (LPT) 24 all of which are conventional. Ambient air 26 first enters the fan 14 and is compressed in turn through the compressors 16 and 18 for providing compressed air 28 to the combustor 20 wherein it is conventionally mixed with fuel and ignited for generating hot combustion gases 30 which flow in turn through the HPT 22 and the LPT 24 which extract energy therefrom for powering the fan 14 and the compressors 16 and 18.

Figure 2:
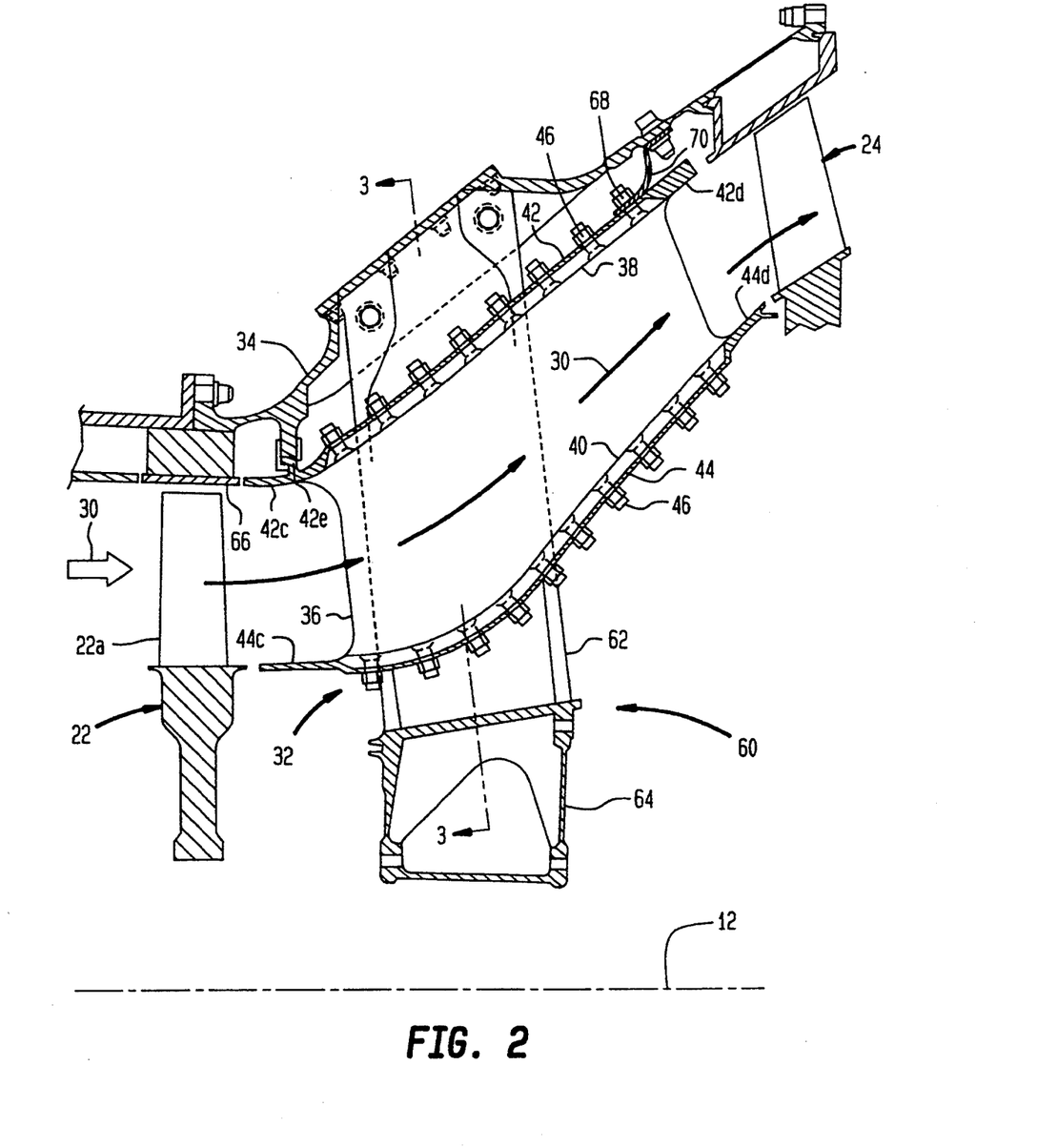
FIG. 2 is an enlarged axial, partly sectional view of the turbine flowpath assembly illustrated in FIG. 1.

A turbine flowpath assembly 32 in the exemplary form of a transition duct in accordance with one embodiment of the present invention is provided between the HPT 22 and the LPT 24 for channeling the combustion gases 30 therebetween. FIG. 2 illustrates in greater detail the upper portion of the assembly 32 shown in FIG. 1 between the HPT 22 and the LPT 24. The assembly 32 includes a conventional annular outer casing 34 disposed coaxially about the longitudinal axis 12, and a plurality of circumferentially spaced apart fairings or airfoils 36 as additionally shown in FIGS. 3–7. Each of the airfoils 36 includes an integral radially outer platform or band 38 which forms a portion of the radially outer flowpath confining the combustion gases 30, and an integral radially inner platform or band 40 forming a portion of the radially inner flowpath confining the combustion gases 30. The outer bands 38 are joined to the outer casing 34.

Figure 3:
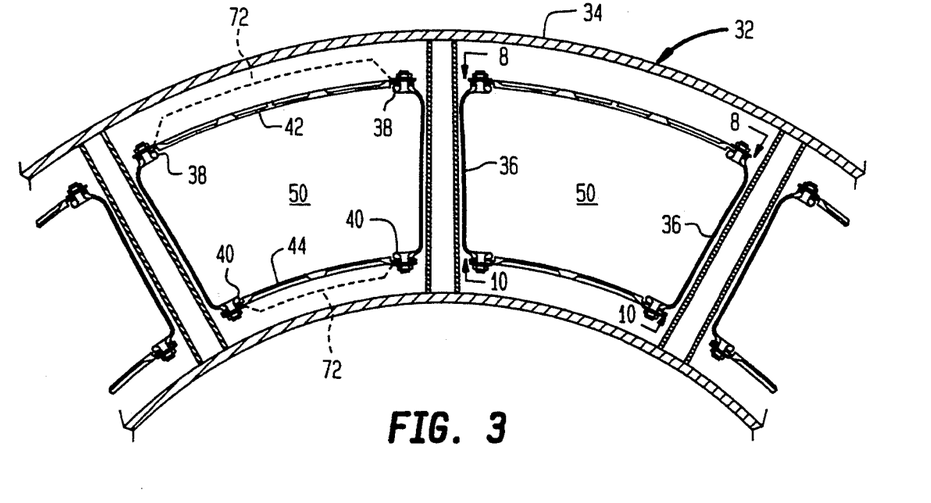
FIG. 3 is a radial sectional view of a portion of the turbine flowpath assembly illustrated in FIG. 2 taken along line 3—3.

The assembly 32 further includes a plurality of radially outer flowpath panels 42 joined to the outer casing 34, and a plurality of radially inner flowpath panels 44 spaced radially inwardly from and directly below respective ones of the outer panels 42. The outer and inner panels 42 and 44 are illustrated in more detail in FIGS. 2–4 and 8–11. As shown in FIG. 3, each of the outer panels 42 is disposed circumferentially between adjacent ones of the outer bands 38, and as shown in greater detail in FIG. 4, each of the outer panels 42 circumferentially overlaps adjacent ones of the outer bands 38, with the outer panel 42 being disposed radially above the outer band 38. Similarly, each of the inner panels 44 is disposed circumferentially between adjacent ones of the inner bands 40, with each of the inner panels 44 circumferentially overlapping an adjacent inner band 40, with the inner panel 44 being disposed radially below the inner band 40.

Figure 4:
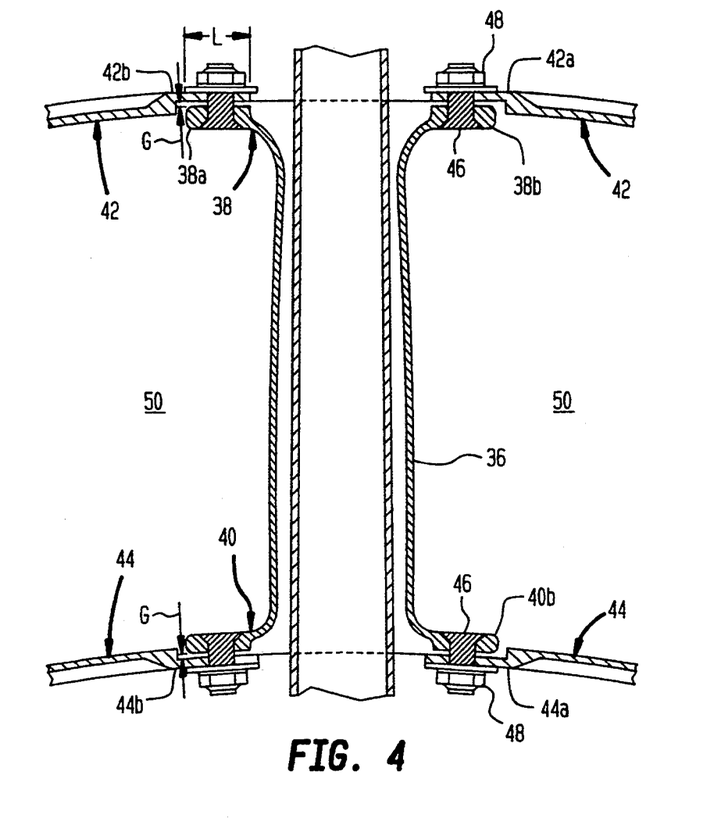
FIG. 4 is an enlarged radial sectional view of one of the airfoils illustrated in FIG. 3.

Means in the exemplary form of a plurality of joining bolts 46 and complementary locknuts 48 are provided for joining together the outer panels 42 with the outer bands 38, and the inner panels 44 with the inner bands 40 at the respective overlaps thereof for allowing limited circumferential movement therebetween. As shown in FIGS. 3 and 4, the turbine flowpath assembly 32 is a circumferentially segmented assembly formed of individual components joined together in segmented rings to define a plurality of circumferentially spaced apart flow ducts 50 for channeling the combustion gases 30 from the HPT 22 to the LPT 24 (see FIG. 2). The outer bands and panels 38 and 42 provide a radially outer boundary for the combustion gases 30, and the inner bands and panels 40, 44 provide a radially inner boundary for the combustion gases 30. The airfoils 36 provide radially extending, lateral boundaries for the combustion gases 30. As shown in FIG. 4, the locknuts 48 threadingly engage the joining bolts 46 for maintaining a predetermined radial gap G at each of the joining bolts 46 between the outer bands 38 and outer panels 42 and between the inner bands 40 and the inner panels 44. The gaps G are relatively small and preferably less than about 0.025 mm for providing effective seals between the respective bands and panels and for allowing substantially unrestrained circumferential movement between the bands and panels.

Figure 8:
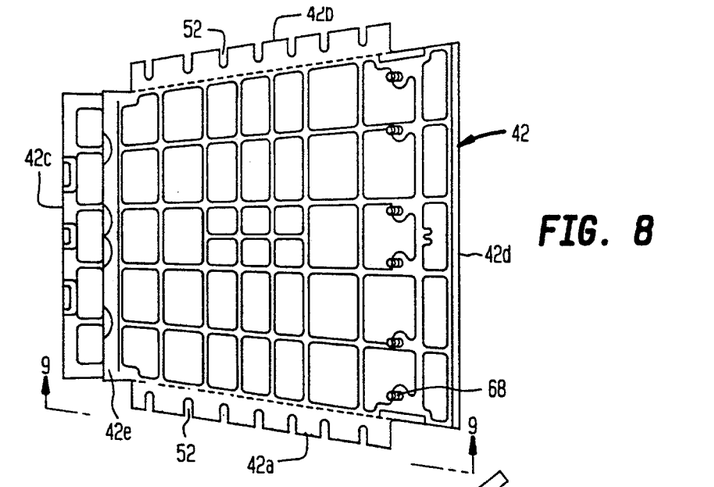
FIG. 8 is a top view of one of the outer flowpath panels illustrated in FIG. 3 along line 8—8 disassembled from the flowpath assembly.
Figures 9, 10:
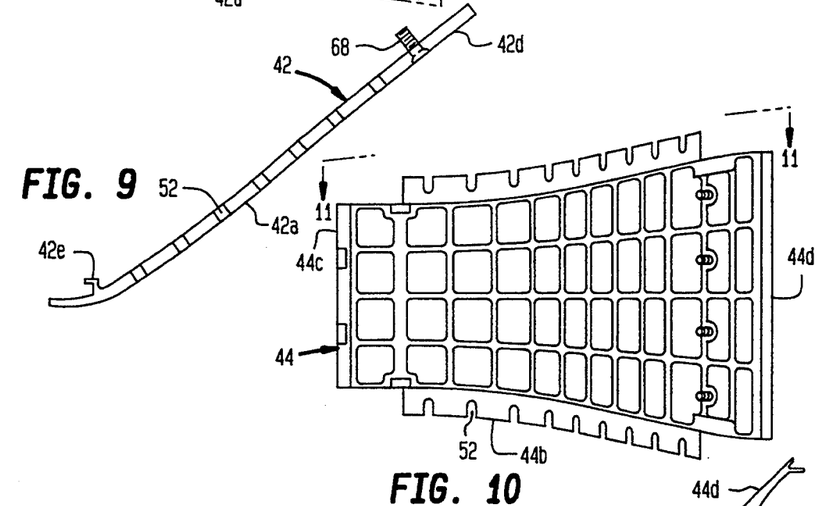
FIG. 9 is a side view of the outer panel illustrated in FIG. 8 taken along line 9—9.
FIG. 10 is a bottom view of one of the inner flowpath panels illustrated in FIG. 3 taken along line 10—10 disassembled from the flowpath assembly.
Figure 11:
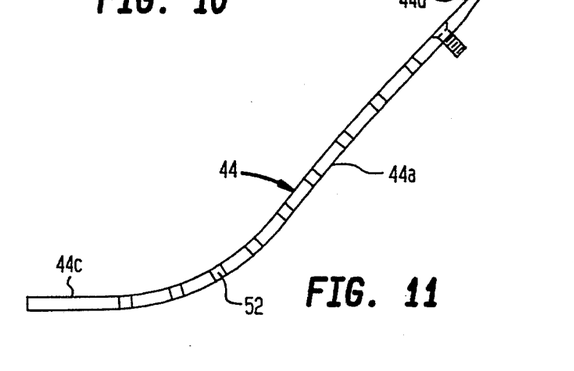
FIG. 11 is a side view of the inner panel illustrated in FIG. 10 taken along line 11—11.

More specifically, and referring to FIGS. 8 and 10, each of the outer and inner panels 42 and 44 is generally rectangular in configuration and has respective first and second circumferentially oppositely extending sides or edges 42a and 42b for the outer panels 42, and 44a and 44b for the inner panels 44. The outer panels 42 also include forward and aft ends 42c and 42d, respectively, and the inner panels 44 similarly include forward ends 44c and aft ends 44d. Each of the outer and inner panel first and second edges 42a, 42b, 44a, 44b has a plurality of axially spaced apart, generally U-shaped slots 52, with seven slots 52 being disposed along each side of the outer panel 42, and nine slots 52 being disposed along each edge of the inner panels 44 in this exemplary embodiment.

Figure 5:
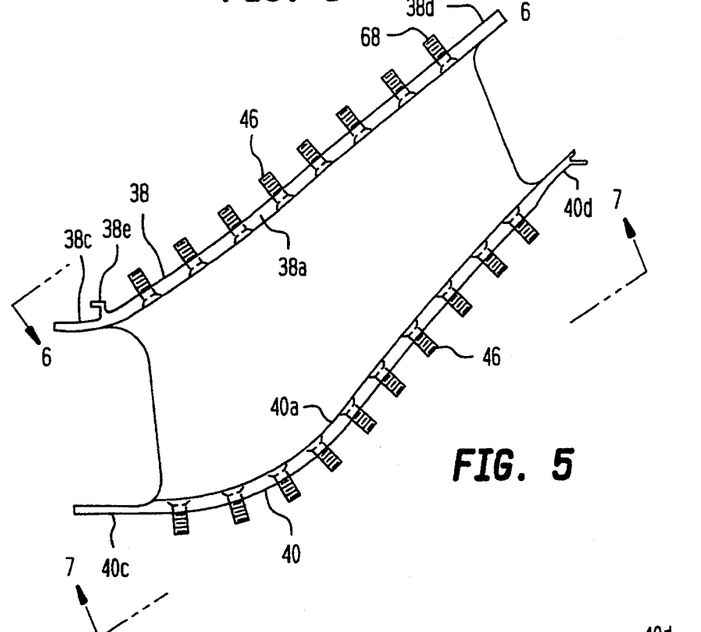
FIG. 5 is an axial view of one of the airfoils illustrated in FIG. 2 disassembled from the flowpath assembly.
Figure 6:
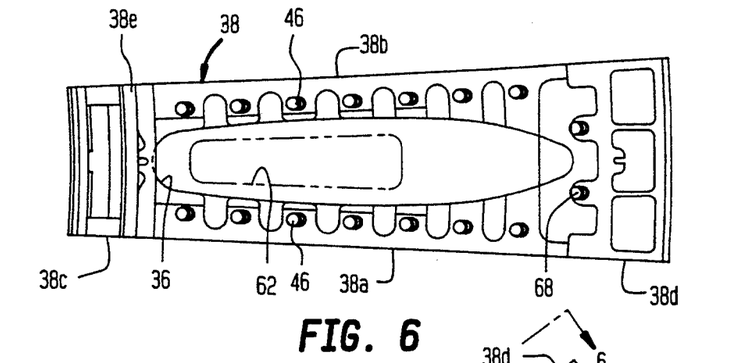
FIG. 6 is a top view of the outer band of the airfoil illustrated in FIG. 5 taken along line 6—6.
Figure 7:
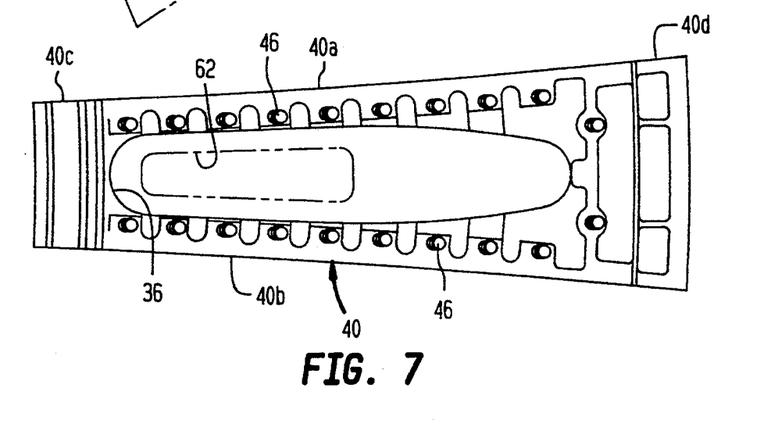
FIG. 7 is a bottom view of an inner band of the airfoil illustrated in FIG. 5 taken along line 7—7.
Figure 12:
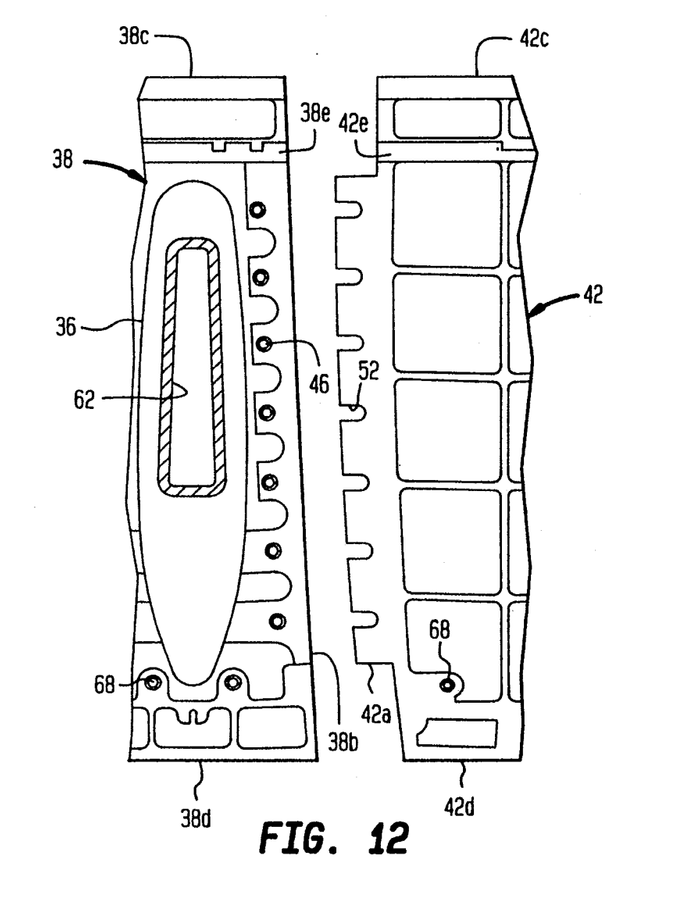
FIG. 12 is a top view of an adjacent outer band and panel axially aligned relative to each other prior to assembly thereof.

As shown in FIGS. 5-7, each of the outer and inner bands 38, 40 is also generally rectangular in configuration and has respective first and second, circumferentially oppositely extending sides or edges 38a, 38b, 40a, and 40b. The outer and inner bands 38, 40 also similarly include respective forward and aft ends 38c, 38d, 40c, and 40d. Each of the first and second edges 38a, 38b, 40a, 40b of the respective outer and inner bands 38 and 40 has a plurality of axially spaced apart ones of the joining bolts 46 fixedly joined thereto by brazing, for example. The joining bolts 46 preferably extend radially outwardly from the outer band 38 and radially inwardly from the inner band 40. The number of joining bolts 46 on each edge of the respective bands 38, 40 is equal to the number of slots 52 on the opposing edge of an adjacent panel 42, 44, with the bolts 46 being axially spaced apart from each other at the same spacing as that of the complementary slots 52 shown in FIGS. 12 and 13, for example. In FIG. 12, an exemplary outer band 38 is initially circumferentially spaced away from an adjacent outer panel 42, and in FIG. 13 they are joined together after assembly. A similar alignment in assembly is provided for the inner bands and panels 40 and 44.

Figure 13:
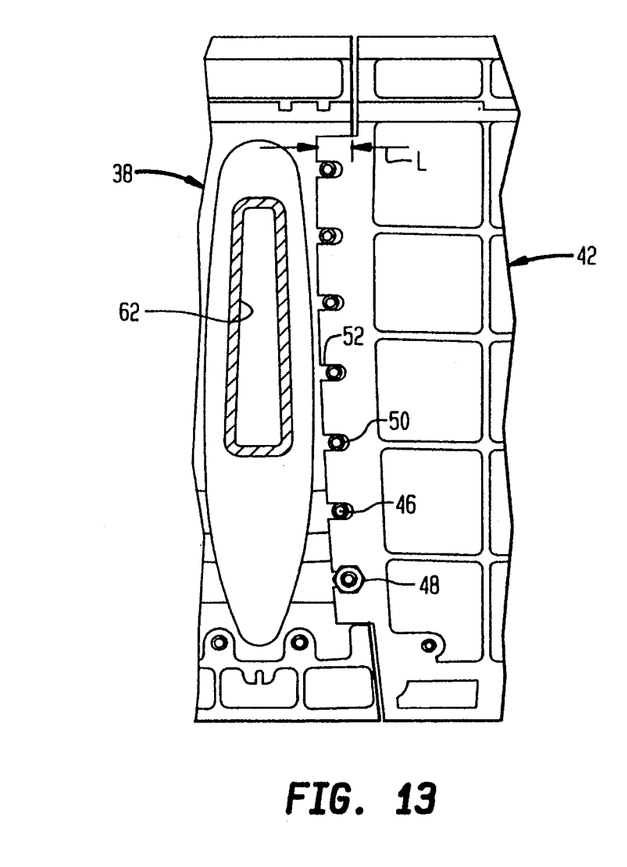
FIG. 13 is a top view similar to FIG. 12 illustrating the joining of the adjacent outer band and panel illustrated in FIG. 12.

Accordingly, the respective first and second edges 42a, 42b, 44a, 44b of the outer and inner panels 42, 44 circumferentially overlap respective first and second edges 38a, 38b, 40a, 40b of the adjacent outer and inner bands 38, 40, with the joining bolts 46 being disposed in respective ones of the slots 52. The locknuts 48 may then be installed on the joining bolts 46 and suitably tightened for radially joining together the outer bands and panels 38, 42 and the inner bands and panels 40, 44. As shown in FIG. 13, the outer diameter of the locknut 48 is suitably larger than the width of the slot 52 for preventing the outer panel 42 from moving radially upwardly away from the outer band 38. Similarly, the locknuts 48 prevent the lower panel 44 from moving radially away from the inner band 40 as shown in FIG. 4.

Once assembled as shown in FIG. 4, with the predetermined gaps G between the respective outer bands and panels 38, 42, and between the inner bands and panels 40, 44, the panels 42, 44 are allowed to move without restraint in the circumferential direction relative to the respective bands 38, 40 for accommodating differential thermal expansion and contraction therebetween during operation. The collective assembly of the individual airfoils 36 joined to the outer and inner panels 42, 44 provides a circumferentially segmented assembly which is allowed to freely expand and contract in the radial direction, with the outer and inner panels 42, 44 being also allowed to freely move in the circumferential direction relative to the airfoils 36 for reducing thermally induced stresses therein. Furthermore, the joining arrangement between the bands 38, 40 and the respective panels 42, 44 provides an effective seal therebetween without the difficulties encountered in conventional straight spline seals. As described above, the gaps G provided between the respective bands 38, 40 and panels 42, 44 are relatively small and preferably less than about 0.025 mm which provides a substantial increase in sealing efficiency over that provided by conventional spline seals. Whereas conventional spline seals require precisely machined retaining slots and a precisely aligned straight spline seal member therein, the seal provided at the gaps G is not dependent on maintaining precise manufacturing tolerances on the assembled parts.

More specifically, since the overlapping edges of the bands and panels provide the actual sealing therebetween, the several joining bolts 46 may be used for mechanical alignment between the respective bands and panels by being inserted into their respective slots 52. This axial and radial alignment feature allows the bands and panels to be joined together, by suitable force for example, with the locknuts 48 then being installed for clamping together the bands and panels with the required gaps G at the joining bolts 46. The plurality of axially spaced apart joining bolts 46 provide an effective solution to joining relatively axially long flowpath segments with effective sealing therebetween. Since the gap G can be carefully controlled at each bolt 46, the bolts 46 are preferably spaced as closely adjacent to each other as required for ensuring effective radial gaps between adjacent bolts 46. And, during operation of the flowpath assembly 32, any creep-induced distortions thereof will provide little degradation of the sealing ability between the overlapping panels and bands since the locknuts 48 will maintain an accurate gap G between the panels and bands. This is an improvement over conventional spline seals which lose ability to provide effective seals if the alignment between their complementary slots containing the spline seal member is distorted during operation.

Furthermore, since the locknuts 48 effectively clamp together the bands and panels with the required radial gap G therebetween, the gap G may be made relatively small as compared to gaps provided in spline seals for providing improved sealing thereover. And, as additionally shown in FIG. 4, the extent of the overlap, designated L, of the bands and panels is preferably substantially larger than the radial gap G resulting in a relatively high L/G ratio which improves sealing therebetween. The L/G ratio is relatively large since the overlap between the panels and bands must be sufficiently large for accommodating the joining bolts 46 and locknuts 48. This provides a degree of sealing greater than that obtainable from conventional spline seals having relatively low length-to-gap ratios.

In the preferred embodiment, the inner and outer band edges 38a, 38b, 40a, 40b provide relatively small circumferentially extending overhangs relative to the airfoil 36 as shown most clearly in FIG. 4 to merely provide sufficient circumferential extent for supporting the joining bolts 46. In this way, the manufacturing tolerances and distortions due to creep during operation are relatively small at these edges for improving the alignment between the band edges and the panel edges for improved assembly thereof.

Yet further, the exemplary flowpath assembly 32 illustrated in FIG. 2 has a highly curved configuration for channeling the combustion gases 30 at inclination radially outwardly from the HPT 22 to the LPT 24 while still providing effective sealing between the bands and panels. As shown in more particularity in FIGS. 5, 9, and 11, at least one of the outer and inner panels 42, 44 and respective bands 38, 40 may be curved or nonlinear in axial transverse section as shown, with the joining bolts 46 and locknuts 48 still being effective for joining together the respective panels and bands for maintaining alignment and sealing therebetween. In this exemplary embodiment, the outer band 38 and outer panel 42 are generally straight along the axial extent of the spaced bolts 46, whereas the inner band 40 and inner panel 44 are curved in axial transverse section along the axial extent of the bolts 46. The resulting flowpath is required for aerodynamic reasons, and the use of conventional spline seals would increase the difficulty and complexity of designing the assembly, and would result in leakage rates commensurate with spline seals sized for large diameter and axial extent applications. However, by joining together the bands and panels in accordance with the present invention using the joining bolts 46 and the locknuts 48, an improved seal therebetween may be maintained along the entire axial extent of even the curved inner bands 40 and inner panels 44 in accordance with the present invention.

Figure 14:
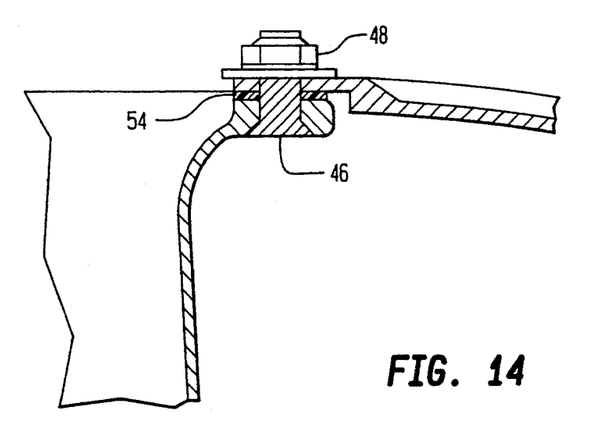
FIG. 14 is an enlarged view of one of the joints between the outer bands and panels illustrated in FIG. 4 showing an assembly shim therebetween.

In order to provide uniform gaps G at the several joining bolts 46, a plurality of removable shims 54 are provided during assembly, with each shim 54 being disposed at a respective one of the joining bolts 46 as shown in FIG. 14, for example, and between respective ones of the outer bands and panels, and the inner bands and panels. The locknuts 48 may then be threaded to engage the joining bolts 46 to compress the shims 54 for providing a predetermined preload in each of the joining bolts 46 so that upon removal of the shims 54 the predetermined radial gap G is provided at each of the joining bolts 46 (as shown in FIG. 4) between the outer bands and panels 38, 42 and between the inner bands and panels 40, 44. Although the shims 54 may be any suitable material and may be suitably removed during initial assembly, the shims 54 are preferably formed of a conventional material such as plastic which will melt during first operation of the gas turbine engine 10 upon being heated by the combustion gases 30 flowing through the ducts 50 for providing the predetermined gaps G.

Figure 15:
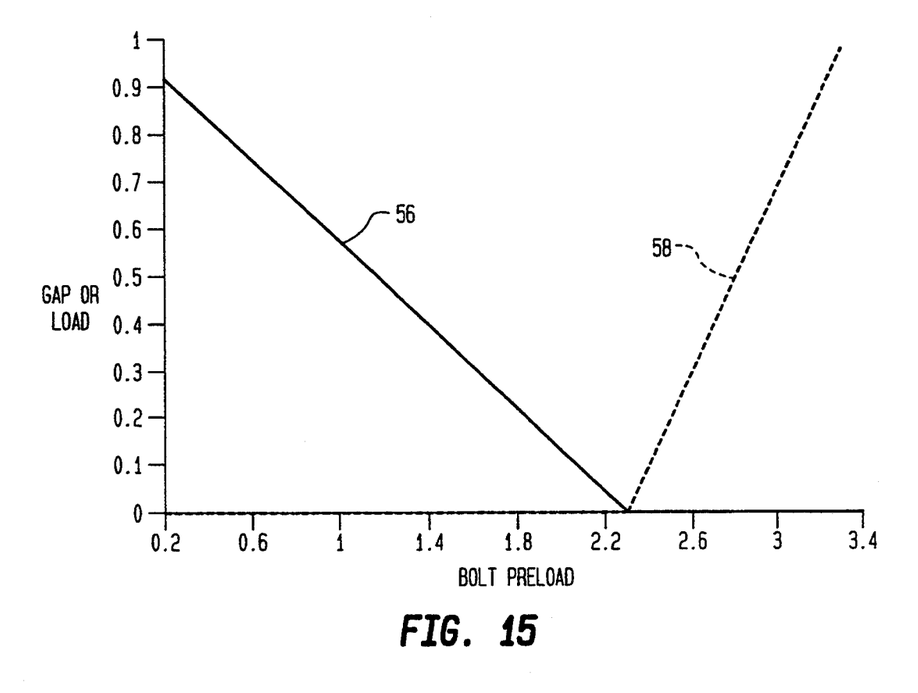
FIG. 15 is a graph plotting residual gap and residual preload versus bolt preload for the compressed shim illustrated in FIG. 14.

FIG. 15 plots on the abscissa the amount of preload in thousands of pounds provided in the joining bolts 46 versus, on the ordinate, the residual gap represented by curve 56 shown in solid line and the residual preload in the joining bolts 46 represented by the curve 58 shown in dashed line. The numerals on the ordinate represent gap in mils (0.001 inch or 0.025 mm) and preload in thousands of pounds. The graph indicates that the locknuts 48 may be tightened to preload the joining bolts 46 and clamp the shims 54 between the bands and panels over a range from a very small bolt preload (0.2) to a relatively large preload (2.3) which will result in a residual gap (or gap G) decreasing in value below 1 mil (0.025 mm) and without any residual preload. In this way, springback or release of the preload from the joining bolts 46 after the shim is removed, by melting for example, further closes the gap over that initially provided by the shim 54 itself.

However, the graph also indicates that for an excessive preload as shown by the curve 58, springback of the joining bolts 46 after the shim 54 is removed, will completely close the gap G and effectively clamp together the bands and panels and thus restrain circumferential sliding movement therebetween. The shims 54, therefore, allow a wide range of assembly preload of the joining bolts 46 while providing an effective residual gap G which may be substantially smaller than the initial gap provided by the shim 54 itself. Improved sealing is thereby effected which is relatively insensitive to torquing of the locknuts 48 during assembly.

Referring again to FIG. 2, the turbine flowpath assembly 32 is in the exemplary form of a transition duct disposed between the HPT 22 and the LPT 24 which further includes a conventional turbine frame 60. The turbine frame 60 conventionally includes a plurality of radially extending struts 62. The airfoils 36 are hollow with corresponding openings through the outer and inner bands 38 and 40 as additionally shown in FIGS. 6 and 7, and each of the struts 62 extends radially through a respective one of the airfoils 36 and is conventionally joined to the outer casing 34 at radially outer ends thereof. The radially inner ends of the struts 62 are conventionally joined to a conventional annular hub 64. The airfoils 36 act as fairings which protect the struts 62 from the hot combustion gases 30. A portion of the compressed air 28 may be conventionally channeled through each of the airfoils 36 for providing effective cooling thereof.

As shown in FIG. 2, the HPT 22 includes a last stage turbine blade-row 22a disposed upstream of the airfoils 36, and a conventional circumferentially segmented, annular shroud 66 is disposed radially outwardly of the blade-row 22a for maintaining a suitable gap therewith as is conventionally known.

The outer bands and panels 38, 42 are joined to the outer casing 34 preferably in radial alignment with the shroud 66 for providing a radially aligned radially outer flowpath for the combustion gases 30. Similarly, the outer bands and panels 38, 42 are also radially aligned with a conventional shroud surrounding the LPT 24, and the inner bands and panels 40, 44 are radially aligned with the conventional inner platforms at the roots of the blades of the last stage blade-row 22a of the HPT 22 and of the blades of the first stage of the LPT 24.

During operation of the engine 10, the outer casing 34 is maintained at a relatively lower temperature than that of the shroud 66 and the outer and inner panels 42, 44 which are directly in contact with the hot combustion gases 30 flowing therepast. Since the shroud 66 is conventionally circumferentially segmented, thermally induced distortion and stress therein is reduced and the shroud 66 is allowed to expand radially with the radial movement of the outer casing 34. A conventional fully annular, non-segmented transition duct disposed downstream of the blade-row 22a would conventionally be subject to thermal distortion and radial expansion which leads to radial misalignment between the upstream end of its outer flowpath and the downstream end of the shroud 66 which causes aerodynamic losses in the combustion gases 30. However, the turbine flowpath assembly 32 of the present invention is also circumferentially segmented which allows the outer bands and panels 38, 42 to expand and contract without restraint in the circumferential direction as compared to a fully annular continuous ring, and the outer bands and panels 38, 42 similarly move with the outer casing 34 to which they are attached. In this way, radial alignment between the shroud 66 and the forward ends of the outer bands and panels 38c and 42c is more accurately maintained.

As shown in FIGS. 5, 6, 8, and 9, each of the outer bands and panels 38, 42 includes a generally L-shaped forward hook 38e and 42e, respectively, extending radially outwardly from each of the forward ends 38c, 42c thereof which are conventionally fixedly joined to a radially inner flange of the outer casing 34 as shown in FIG. 2, for example. The hooks 38e, 42e are similar to those used in conventional shrouds, such as the shroud 66, for supporting the forward ends of the outer bands and panels 38c, 42c to the outer casing 34. The aft ends of the outer bands and panels 38d, 42d include a plurality of circumferentially spaced apart mounting bolts 68 extending radially outwardly therefrom which are used to fixedly join the aft ends 38d, 42d to an aft mounting bracket 70 extending radially inwardly from the outer casing 34 as shown in FIG. 2. The hooks 38e, 42e and the mounting bolts 68, and complementary nuts, fixedly join the outer bands and panels 38, 42 to the outer casing 34. In turn, the airfoils 36 and inner bands and panels 40, 44 are also supported and suspended from the outer casing 34. The aft mounting bracket 70 may include oversized apertures for receiving therethrough the mounting bolts 68 to allow for unrestrained axial expansion and contraction of the outer bands and panels 38, 42 if desired.

Although the turbine flowpath assembly 32 has been described above with respect to the exemplary transition duct between the HPT 22 and the LPT 24, it may also be practiced for turbine nozzles channeling the combustion gases 30 to turbine blade-row stages such as the blade-row 22a, for example. The assembly 32 in accordance with the present invention provides improved mounting, sealing, and alignment for relatively large diameter and relatively axially long flowpath segments in this exemplary embodiment. The airfoils 36 including their bands 38, 40 are preferably separate components and independent of the outer and inner panels 42, 44.

Accordingly, the discrete airfoils 36 and panels 42, 44 may be separately manufactured by any suitable technique specific to their particular configurations. For example, conventional centrifugal casting may be used for the panels 42, 44 with conventional lathe turning operations for providing the required configurations for each design application. And, the airfoils 36 including the integral bands 38, 40 may be separately manufactured using conventional casting techniques. As shown in FIGS. 6, 7, 8, and 10, the back sides of the bands 38, 40 and panels 42, 44 preferably have integrally formed structural ribs to provide strength with low weight, whereas the opposite, flow sides thereof are smooth. As shown in phantom line in FIG. 3, additional reinforcing ribs 72 may be suitably joined to the panels 42, 44 for further increasing strength if desired.

As described above, the outer and inner panels 42, 44 are suitably mechanically attached to the outer and inner bands 38, 40 with improved alignment therebetween during initial assembly thereof as well as during subsequent operation. The short overhang distance of the bands 38, 40 relative to the airfoils 36 provides maximum dimensional stability during manufacture. The resulting gap G between the bands and panels is predeterminedly small for providing effective sealing for preventing the compressed air 28 from flowing between the outer bands and panels 38, 42 into the flow ducts 50, as well as seals the combustion gases 30 within the flow ducts 50.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A gas turbine annular flowpath assembly located about a longitudinal centerline axis for channeling combustion gases comprising:
   an annular outer casing;
   a plurality of circumferentially spaced apart, radially extending airfoils each having a radially outer band extending axially and circumferentially therefrom and a radially inner band extending axially and circumferentially thereform;
   a plurality of flowpath radially outer panels, each forming a circumferential segment of said annular flowpath assembly and having a radially outwardly extending member fixedly joined to said outer casing, each outer panel extending circumferentially between and circumferentially overlapping adjacent ones of said outer bands radially thereover;
   a plurality of flowpath radially inner panels, each forming a circumferential segment of said annular flowpath assembly and, each inner panel extending circumferentially between and circumferentially overlapping adjacent ones of said inner bands radially thereover;
   means for joining together said outer bands and panels, and said inner bands and panels, respectively, at said respective overlaps thereof for restraining radial movement while allowing circumferential movement therebetween; and
   said outer and inner panels being disposed in pairs between adjacent ones of said airfoils to define a flow duct therebetween for channeling said combustion gases, said flow duct being supported and suspended from said outer casing by said outer panel.

2. An assembly according to claim 1 wherein:
   each of said outer and inner panels has respective first and second circumferentially oppositely extending edges, and forward and aft ends, each of said panel first and second edges having a plurality of axially spaced apart slots;
   each of said outer and inner bands has respective first and second circumferentially oppositely extending edges, and forward and aft ends, each of said band first and second edges having a plurality of axially spaced apart joining bolts fixedly joined thereto;
   said outer and inner panel first and second edges, circumferentially overlap respective first and second edges, of said adjacent outer and inner bands, with said joining bolts being disposed in respective ones of said slots; and
   said joining means include a plurality of locknuts engaged with respective ones of said joining bolts for radially joining together said outer bands and panels and said inner bands and panels.

3. An assembly according to claim 2 further including a plurality of removable shims each disposed at a respective one of said joining bolts and between respective ones of said outer bands and panels, and said inner bands and panels; and
   wherein said locknuts engage said joining bolts for compressing said shims for providing a predetermined preload in said joining bolts so that upon removal of said shims a predetermined gap is provided at each of said joining bolts between said outer bands and panels and between said inner bands and panels.

4. An assembly according to claim 3 wherein said shims are formed of a material which will melt upon being heated by said combustion gases for providing said predetermined gaps.

5. An assembly according to claim 2 wherein said locknuts engage said joining bolts for maintaining a predetermined gap at each of said joining bolts between said outer bands and panels and between said inner bands and panels.

6. An assembly according to claim 5 wherein said gap is less than about 0.025 mm.

7. An assembly according to claim 5 wherein at least one of said outer and inner panels is nonlinear in axial transverse section, and said plurality of joining bolts and locknuts join together said respective panels and bands for maintaining alignment and sealing therebetween.

8. An assembly according to claim 5 further comprising:
a turbine blade-row disposed upstream of said airfoils;
a shroud disposed radially outwardly of said blade-row and joined to said outer casing; and
wherein said outer bands and panels are joined to said outer casing in radial alignment with said shroud for providing a radially aligned outer flowpath for said combustion gases.

9. An assembly according to claim 8 wherein each of said outer bands and panels includes a generally L-shaped forward hook extending radially outwardly from said forward ends thereof, and a plurality of mounting bolts extending radially outwardly from said aft ends thereof, said forward hooks and said mounting bolts being fixedly joined to said outer casing for supporting said outer and inner panels and said airfoils to said outer casing.

10. An assembly according to claim 8 further comprising a turbine frame including a plurality of struts each extending radially through a respective one of said airfoils and joined to said outer casing at radially outer ends thereof, with radially inner ends thereof being joined to an annular hub.

* * * * *